April 27, 1954
W. I. NISSEN
2,676,475
CIGAR LIGHTER STRUCTURE
Filed Oct. 12, 1951
2 Sheets-Sheet 1
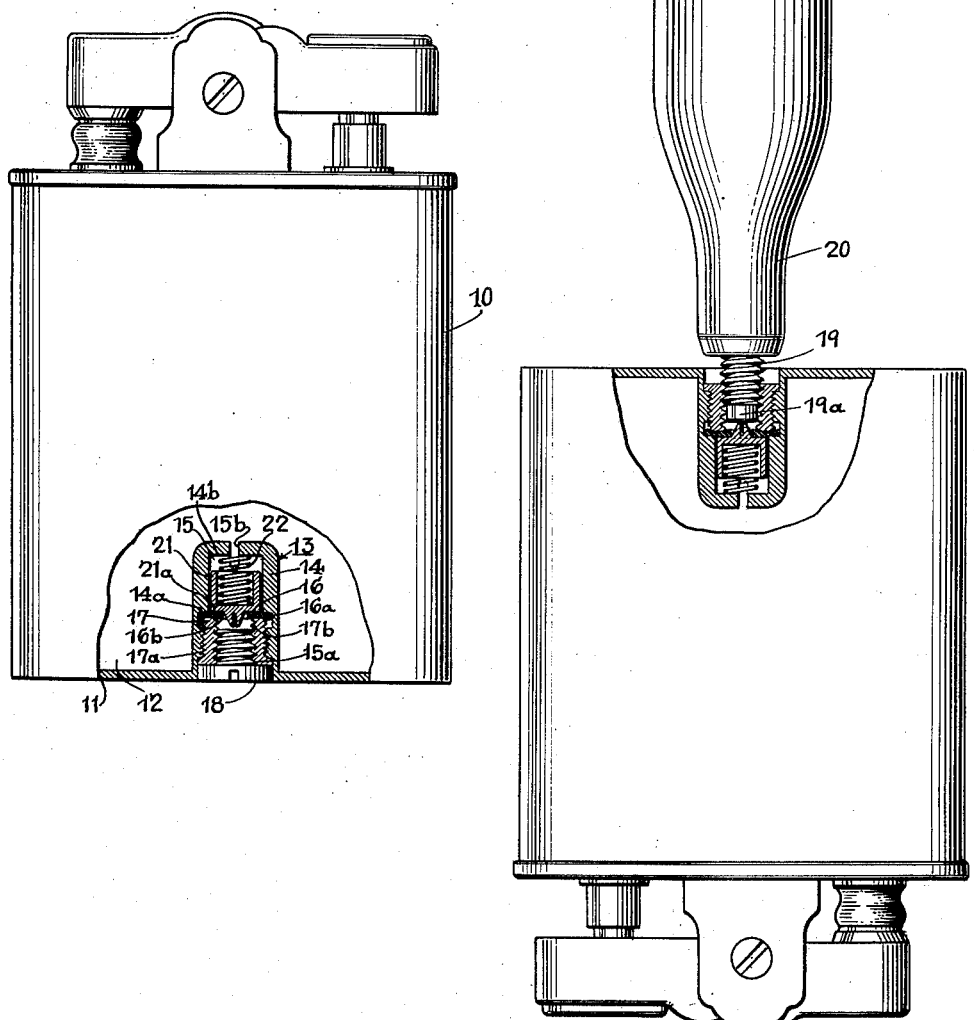
INVENTOR.
WARREN I. NISSEN.
BY Ward, Crosby & Neal
ATTORNEYS.

April 27, 1954
W. I. NISSEN
2,676,475
CIGAR LIGHTER STRUCTURE
Filed Oct. 12, 1951
2 Sheets-Sheet 2
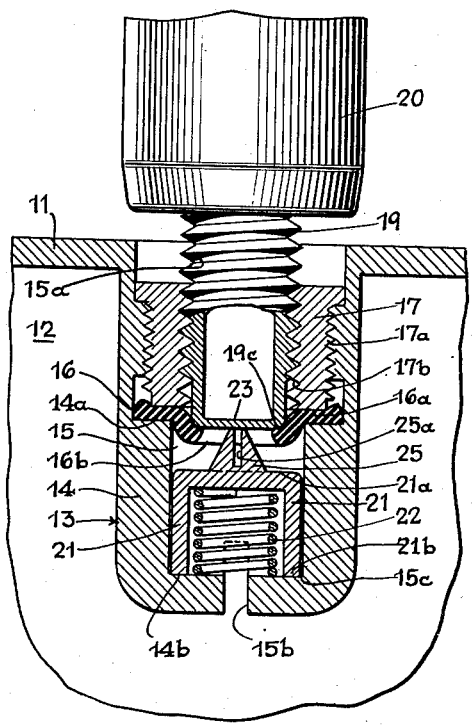
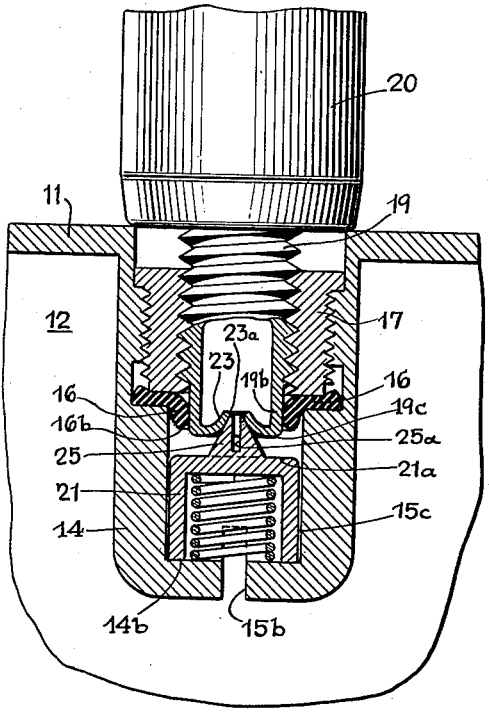
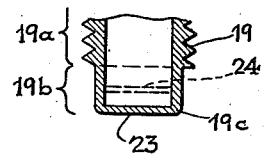
INVENTOR.
WARREN I. NISSEN.
BY Ward, Crosby & Neal
ATTORNEYS.

Patented Apr. 27, 1954

2,676,475

UNITED STATES PATENT OFFICE 2,676,475

CIGAR LIGHTER STRUCTURE

Warren I. Nissen, Basking Ridge, N. J., assignor to Ronson Art Metal Works, Inc., Newark, N. J., a corporation of New Jersey Application October 12, 1951, Serial No. 251,028

3 Claims. (Cl. 67—7.1)

This invention relates to lighters which are charged by fuel supplied from an outside fuel container. It has particular advantages regarding lighters fueled by gases which are contained in such an outside fuel container and which are readily liquefiable under pressure and supplied in liquid form, the outside fuel container having a frangible membrane which is punctured for the delivery of the fuel to the lighter. The invention may also be used with respect to lighters fueled by liquid petroleum fuels as ordinarily now used in such devices.

The invention in one aspect thereof is constituted by a cigar lighter including a lighter casing having a fuel chamber therein constructed to hold gaseous fuel under pressure, and a fuel charging valve structure for such chamber, said structure including a valve housing mounted preferably in the casing and having a valve chamber therein. An elastic sealing diaphragm is mounted in the valve housing and extends transversely into the valve chamber with the rim portion of the diaphragm secured in fluid-sealing relationship to the wall defining such valve chamber. The diaphragm has an opening formed therein to provide an annular lip which is positioned to engage and seal against the neck of a fuel charging cartridge when the latter is inserted into such valve chamber. Disposed in the latter chamber is a fuel valve member positioned inwardly of the diaphragm and mounted for movement between an outer closed position wherein such valve member engages in sealing relation against the sealing diaphragm, and an inner open position wherein the valve member is spaced inwardly with respect to the sealing diaphragm. A cartridge puncturing head is provided for said valve structure which is aligned with the aforesaid diaphragm opening and is mounted to move with said valve member whereby the puncturing head is positioned to engage the neck of a fuel charging cartridge when the latter is inserted as aforesaid thereby to move such valve member from such outer closed position to its inner open position, the valve member being releasable to return to its closed position when the fuel charging cartridge is removed from the valve chamber.

In one of its aspects the invention aims to provide a cigar lighter injection valve device having a reliable seal against the leakage of a gaseous or liquid fuel which may be contained in such lighter. The seal is effective to prevent the leakage of fluid, whether or not under pressure, while the same is being transferred from a source container, such as a disposable charging cartridge, into the fuel chamber of the lighter and after such container has been disengaged from the lighter. The invention also aims to provide such an injection valve device adapted to puncture a frangible membrane of such a charging cartridge without breaking off parts of the membrane, which parts, if broken away, might interpose themselves between the valve surfaces of the valve structure and cause leakage of fluid from the lighter. The invention also aims to provide a fluid-tight engagement between an injection nozzle and the engaging valve parts of the cigar lighter, which engagement is of greater efficiency than those heretofore proposed. Further objects and advantages of the invention will be in part obvious and in part specifically pointed out in the description hereinafter contained which, taken in conjunction with the accompanying drawings, discloses a lighter structure of preferred form which is constructed to operate in accordance with the invention; the disclosure, however, should be considered as merely illustrative of the invention in its broader aspects.

In the drawings:

Fig. 1 is a side elevation on an enlarged scale, partly in section and with parts broken away, of the novel cigar lighter valve structure in a closed position and having a removable protective plug or cover plate in association therewith;

Fig. 2 is a side elevation of the lighter shown in Fig. 1 in an inverted or fuel-charging position and in association with a disposable charging cartridge which is shown with the injection nozzle thereof partially inserted into the fuel-charging valve structure, the latter also being shown partly in section and with parts broken away;

Fig. 3 is a fragmentary detailed view on a further enlarged scale, also partly in section and with parts broken away, of the fuel-charging valve structure shown in Fig. 2 with the injection nozzle of the fuel cartridge more deeply inserted relative to its position shown in Fig. 2;

Fig. 4 is a view similar to that shown in Fig. 3 with such injection nozzle in a still further inserted position; and Fig. 5 is a fragmentary sectional view of an injection nozzle which may be employed with the present invention.

Referring now to Figs. 1 and 2, the novel valve structure will be first described with the valve thereof in closed condition. A cigar lighter is provided having a fuel casing 10, the latter having a bottom plate 11. Said casing defines a fuel chamber 12 for the fuel. The lighter is provided with a fuel-charging valve structure generally designated at 13 which includes a valve housing 14 mounted preferably in the casing 10, such housing defining a valve chamber or passageway 15 having an inlet, as at 15a, and an outlet, as at 15b, into said fuel chamber 12.

A flexible sealing diaphragm 16, preferably of resilient rubber-like material, is positioned in said valve chamber or passageway with the rim portion thereof, as at 16a, secured in fluid-sealing relationship with respect to the wall defining such valve chamber. The flexible diaphragm normally closes the passageway through the valve structure 13 by cooperation with a valve member to be described hereinafter. In the form shown, the diaphragm rim portion 16a is clamped in such fluid-sealing relationship between a shoulder 14a formed in said valve housing 14 and a so-called bushing or sleeve member 17 which is provided with external threads, as at 17a, for engaging an inner threaded portion of the housing 14 and also with internal threads 17b designed for engaging the threaded portion of a cover plate 18, or alternatively the threads of a threaded injection nozzle 19 of a disposable fuel cartridge 20 (Fig. 2).

The embodiment of the invention shown in the drawings is especially adapted for the injection of a compressed liquefied gas, such as butane, from such disposable cartridge 20 into such fuel chamber 12. I have found it desirable for the cartridge 20 to contain a charge of fuel, such as the above-mentioned butane or propane, which may be partly in liquid and partly in gaseous form, and also an appropriate pressurizing neutral gas of lower specific gravity, such as nitrogen, wherein the fuel in liquid form is urged downwardly by such pressurizing gas as when the cartridge is inverted. The charging is accomplished with the lighter and cartridge in such inverted position, as shown in Fig. 2.

The flexible diaphragm 16 has a central opening 16b therethrough in the portion thereof which extends transversely of the chamber or passageway 15, through which opening, fluid may pass through such chamber when the valve structure is open, as will be explained herebelow. The above-mentioned valve member which cooperates with the flexible diaphragm 16 for opening and closing the valve structure is indicated generally at 21 and, in the form shown, is of hollow cuplike conformation and is disposed in the valve chamber 15 inwardly of the diaphragm 16, between the latter and a shoulder 14b of the housing 14, which shoulder acts as a limit-stop for inward movement thereof, as will appear more fully hereinafter. The valve member 21 is movable between an outer or closed position, as shown in Figs. 1 and 2, wherein a portion thereof, as at 21a, is in sealing engagement with the inner face of the diaphragm 16 and seals the opening 16a, and an inner open position (Figs. 3 and 4) wherein the valve member is spaced inwardly away from said sealing diaphragm and the opening 16b is no longer closed thereby. In such inner open position the valve member is engaged against the portion 14b of the housing 14 which acts as a limit-stop therefor.

I have found it desirable to employ resilient means, such as a coil spring 22, to urge the valve member 21 toward its outer or closed position. However, it is understood that gaseous pressure within the fuel chamber 12 normally will urge the valve member 21 towards sealing engagement with the diaphragm 16. The coil spring 22 assists such pressure and insures a positive seal of the valve structure, for example, when the gas pressure within the chamber 12 becomes low.

As is shown in Fig. 3, the outer diameter or cross sectional area of the valve member 21 is sufficiently smaller than the inner diameter or cross sectional area of the portion of the chamber 15 in which it moves to permit the passage of fluid therebetween, for example, through an annular passage indicated at 15c.

As viewed in Fig. 5, the injection nozzle 19 is provided with a threaded portion, as at 19a, and an unthreaded tip portion, as at 19b, having a circular edge 19c. Extending across the edge 19c of such tip is the above-mentioned frangible membrane indicated at 23 which preferably is integral therewith. Normally the frangible membrane is situated across said outermost edge 19c. However, if desired, the membrane may be disposed slightly inwardly relative to such edge or lip 19c, as shown, for example, in broken lines at 24.

The diameter of the opening 16b in the diaphragm 16 is normally substantially less than the diameter of the neck portion 19b, as is well shown in Fig. 3, which indicates that the portions of the diaphragm 16 marginal to the opening 16b form a resilient annular lip which is stretched to a substantial degree as such neck portion is progressively inserted into the valve structure. Thus such resilient annular lip makes the above-mentioned fluid-sealing engagement with the nozzle 19 as it is progressively inserted into the passage or chamber 15.

A membrane puncturing head 25 is provided and, in the embodiment shown, is secured to the valve member 21 and thus is adapted for movement therewith as will be explained hereinafter. The puncturing head 25 preferably is of conical shape and is slotted, as at 25a, to facilitate the passage of fluid from the cartridge 20 into the chamber 12 after the membrane 23 has been punctured. The puncturing head 25 is outwardly directed toward the inlet 15a of the passage or chamber 15 and, as is well shown in Figs. 1 and 2, protrudes through the opening 16b and hence is normally surrounded by the diaphragm 16. The degree of penetration of the injection nozzle 19, together with the conformation of the puncturing head 25, are so selected that the membrane 23 will merely be punctured without having portions thereof severed or broken away therefrom, which portions might become interposed between, for example, the valve member 21 and the sealing diaphragm 16 to cause gas leakage when the valve structure should be closed.

In operation, the valve parts are normally in the position shown in Fig. 1. However, when it is desired to inject a fluid into the chamber 12, the cover plate 18 is removed, the injection nozzle 19 is inserted into the passageway or valve chamber 15, and the threads of the nozzle 19 engage the inner threads 17b of the bushing 17. The nozzle is progressively thrust into such passageway or valve chamber 15 by rotating same relative to the lighter. Continued relative rotation of the cartridge 20 and the injection nozzle 19 causes the outer surface of the frangible membrane 23 to engage the outermost point of the puncturing head 25, as shown in Fig. 2. At this point of the operation the valve structure is closed, the valve member 21 being in sealing engagement with the diaphragm 16. Further relative rotation of the cartridge 20 will advance the nozzle 19 to a position where the outer edge 19c thereof (Fig. 5)

engages in sealing relationship with the sealing diaphragm 16, the valve member 21, and, of course, the puncturing head 25 in the meanwhile having been shifted axially downwardly, as viewed in Figs. 2 and 3. However, at the instant of engagement between said nozzle edge or lip 19c and diaphragm 16, in the form shown, the valve member 21 has not yet reached its lowermost position against the limit-stop 14b. Additional relative rotation of the cartridge 20 will urge the parts to the position shown in Fig. 3 wherein the sealing diaphragm is pushed inwardly with the portion marginal to the opening 16b somewhat stretched and in tight sealing engagement with the nozzle edge or lip 19c. At this point, of course, the membrane 23 is not yet punctured, however, the parts are prepared for the delivery of the fuel from the cartridge into the chamber 12. However, at this point the lower lip 21b of the valve member 21 is in engagement with said limit-stop 14b. Still further relative rotation of said charging cartridge will advance the nozzle to the position shown in Fig. 4 wherein the neck portion, as at 19b of the nozzle 19, has stretched the diaphragm 16 sufficiently to enter the opening 16b. That is, the portions of such diaphragm marginal to the opening 16b are sufficiently stretched to embrace such neck portion in an engagement which is tighter than that shown between the same parts in Fig. 3. Thus prior to the puncturing of the membrane 23 a gastight seal is formed between the nozzle 19 and the flexible diaphragm 16 to prevent the escape of gases to exterior space via the threads between the nozzle 19 and the bushing 17. The degree of insertion of the nozzle 19 preferably is selected such that the head 25 merely punctures the membrane 23 without the breaking off or severing of any parts thereof which otherwise might occur if the portions of the membrane were pressed inwardly to a large extent, for example, against the walls of the nozzle. When the nozzle has progressed to the point shown in Fig. 4, adequate passage is provided for the transfer of fuel from the cartridge to the fuel chamber 12, there being an uninterrupted passage via said puncture in the membrane 23, the slot 25a, the passage 15c and the outlet 15b. Thus it is not necessary to urge the nozzle so deeply into the valve chamber or passageway when the membrane 23 is deformed in any considerable degree beyond that merely necessary for puncturing.

When the cartridge 20 is unscrewed or removed from the lighter, the relative position of the nozzle lip or edge 19c and the portion 21a of the valve 21 is such that the latter engages the sealing diaphragm 16 prior to a disengagement of the nozzle 19 and said diaphragm, thereby insuring against the leakage of gas from the chamber 12 during the disengagement of cartridge.

If the fluid contained in the cartridge 20 is, as above mentioned, compressed liquid butane, a portion of it will be in gaseous form. However, the force required to transfer the liquid from the cartridge into the chamber 12 may be obtained by said neutral pressurizing gas above the level of the liquid butane. For example, compressed carbon dioxide or nitrogen initially may be injected into the cartridge 20, and due to the lower specific gravity thereof as compared to the liquid butane, it will rise above the level of the liquid, and when the cartridge is inverted to the position shown in Fig. 2, there will be substantial pressure urging the liquid downwardly toward the fuel chamber 12.

The injection valve structure defined herein can be employed either with or without the absorbent packed reservoir.

While the invention has been disclosed as carried out by a cigar lighter transfer valve of the specific construction above described, it should be understood that changes may be made therein without departing from the invention in its broader aspects within the scope of the appended claims.

I claim:

1. A lighter of the character described, comprising a casing having therein a fuel chamber constructed to hold gaseous fuel under pressure, and a fuel charging valve structure for said chamber, said structure including a valve housing mounted in said casing and having a valve chamber therein, an elastic walled sealing diaphragm mounted in said housing to extend transversely into said last-mentioned chamber, the portion of said diaphragm which extends into said chamber being deformable inwardly to a position deeper in said chamber and having an opening therethrough to provide a deformable annular lip in said diaphragm which lip is positioned to engage and seal against the neck of a fuel charging cartridge when the latter is inserted into said last-mentioned chamber during a fuel charging operation, and a fuel valve member disposed in said last-mentioned chamber inwardly of said diaphragm, means for mounting said valve member for movement between an outer closed position wherein such member engages in sealing relation against the inner face of said sealing diaphragm, and an inner open position wherein the valve member is spaced inwardly with respect to said sealing diaphragm, said valve structure having a cartridge puncturing head aligned with the aforesaid diaphragm opening and mounted to move with said valve, said puncturing head being positioned to engage with the neck of a fuel charging cartridge when inserted as aforesaid, to thereby move said valve to its inner open position during a fuel charging operation, and release said valve for movement back to its aforesaid closed position when a fuel charging cartridge is removed from said last-mentioned chamber.

2. A lighter of the class described, comprising a casing having a fuel chamber therein constructed to hold gaseous fuel under pressure; and a fuel charging valve structure for said chamber, said structure including: a valve housing mounted in said casing and having a passageway therethrough, a deformable sealing diaphragm extending transversely into said passageway and having its rim portion secured in fluid-sealing relationship to the wall defining such passageway, the portion of said diaphragm which extends transversely into said passageway, being deformable inwardly to a position deeper in said passageway and having an opening therethrough to provide an annular lip which is positioned to engage and seal against the neck of a fuel charging cartridge when the latter is inserted into the passageway, and a fuel valve member disposed in such passageway inwardly of said diaphragm, means for mounting with valve member for movement between an outer closed position wherein such member engages in sealed relation against the inner face of said sealing diaphragm, and an inner open position wherein such member is spaced inwardly with respect to said sealing diaphragm, said structure having a cartridge puncturing head aligned with the aforesaid diaphragm opening and mounted to move with said valve member, said puncturing head being positioned to engage a frangible membrane of a fuel charging cartridge when the latter is inserted as aforesaid thereby to move said valve member to its inner open position during a fuel charging operation, and also being positioned to release said valve member for return movement to its aforesaid closed position when the fuel charging cartridge is removed from the passageway.

3. A cigar lighter of the character described, including a lighter casing having a fuel chamber therein and a fuel charging passageway leading through said casing to said chamber, the lighter being constructed to hold gaseous fuel under pressure, an elastic sealing diaphragm member having a central portion extending transversely into such passageway and having its rim portion secured in fluid-sealing relationship with respect to the wall surrounding said passageway, the central portion of said diaphragm member having an opening therethrough to provide an elastic annular lip which is positioned to engage and seal against the neck of a fuel charging cartridge when the latter is inserted into such passageway, a fuel valve member disposed in said passageway on the inner side of said diaphragm member, means for mounting said valve member for movement between an outer closed position in sealing relation against the inner face of said diaphragm member and an inner open position spaced inwardly with respect to such diaphragm member, and a cartridge puncturing head aligned with said diaphragm opening and mounted to move with said valve member.

References Cited in the file of this patent

UNITED STATES PATENTS

| Number | Name | Date |
|---|---|---|
| 2,120,297 | Reinecke | June 19, 1938 |
| 2,209,956 | Chase et al. | Aug. 6, 1940 |
| 2,392,501 | Pool | Jan. 8, 1946 |
| 2,433,119 | Hansen | Dec. 23, 1947 |
| 2,561,270 | Felt | July 17, 1950 |

FOREIGN PATENTS

| Number | Country | Date |
|---|---|---|
| 10,826 | Great Britain | 1912 |
| 723,190 | France | Jan. 12, 1932 |